UNITED STATES PATENT OFFICE 2,377,035

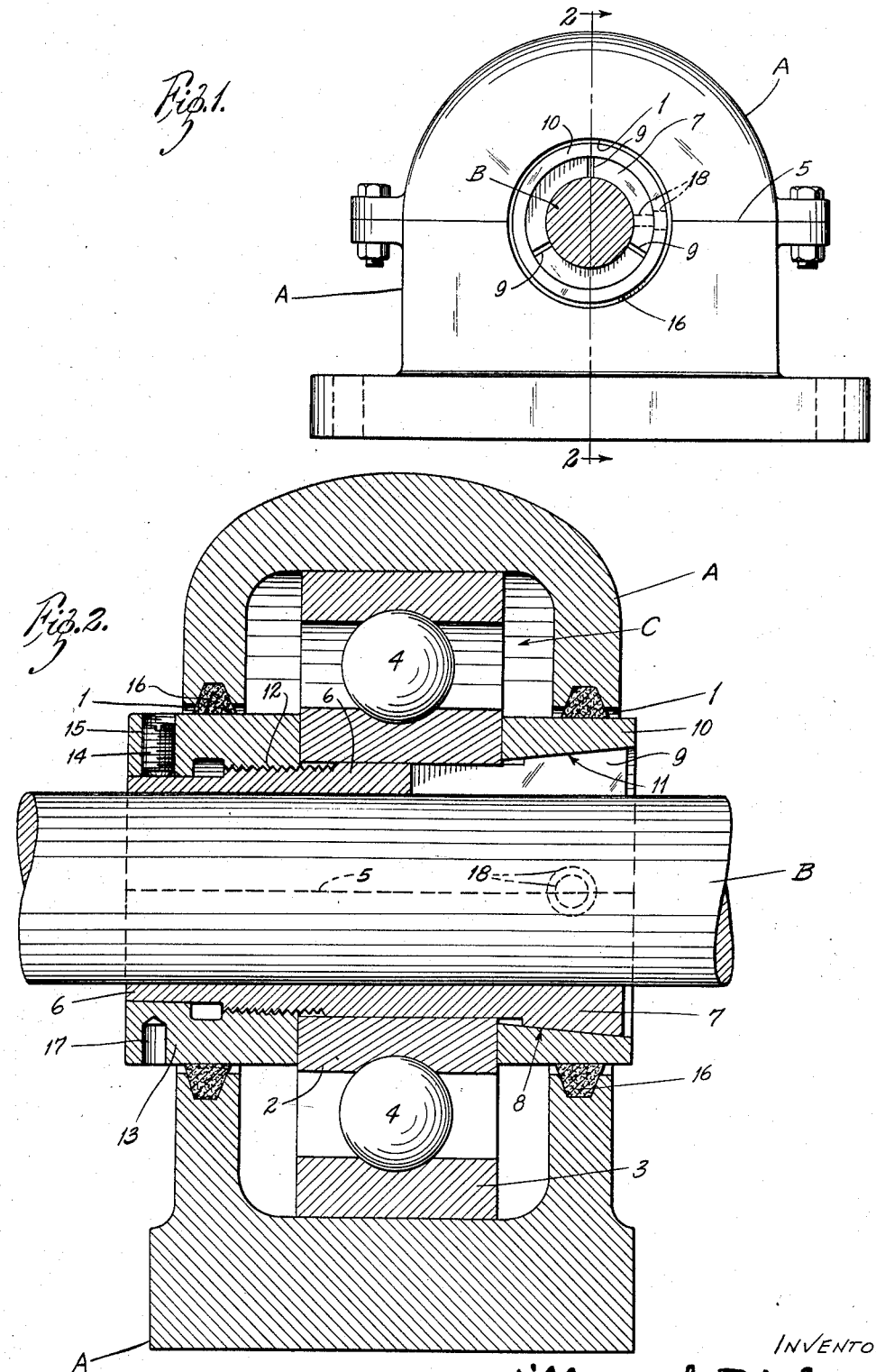

BEARING MOUNTING

William I. Pixley, University City, Mo.

Application April 10, 1944, Serial No. 530,331

5 Claims. (Cl. 287—52.06)

This invention relates to devices for fastening the races of rotary antifriction bearings to shafts or other supporting members therefor. The invention has for its principal object a simple and economical unit-handled rotary antifriction bearing mounting in which one of the bearing races may be quickly and easily fastened to the supporting member therefor without marring said member and without radial distortion of said race. The invention consists principally in a unit-handled rotary antifriction bearing mounting comprising a race supporting sleeve having a longitudinally slit portion and means cooperating with said sleeve and opposite ends of the race thereof for clamping said sleeve to the support therefor and for holding said race against rotary and endwise movement on said sleeve. The invention further consists in the unit-handled bearing mounting and in the parts and combinations and arrangements of parts hereinafter described and claimed.

In the accompanying drawing, which forms part of this specification and wherein like symbols refer to like parts wherever they occur, Fig. 1 is an end elevational view of a rotary antifriction pedestal bearing provided with a bearing mounting embodying my invention; and Fig. 2 is a central vertical longitudinal sectional view on the line 2—2 in Fig. 1.

In the accompanying drawing, my invention is shown embodied in a pedestal or pillow block bearing comprising a bearing supporting housing A with axially alined circular openings 1 through the end walls thereof, a shaft B extending horizontally through said openings and a rotary antifriction bearing C mounted in said housing and rotatably supporting said shaft therein. As shown in the drawing, the rotary antifriction bearing C comprises annular inner and outer raceway members 2 and 3, respectively, and a circular series of balls or other rolling elements 4 therebetween. The outer raceway member 3 of the bearing C seats in the housing A concentric with the openings 1 in the end walls thereof. The housing A is split along a line 5 passing through the axis of the shaft B so as to permit the bearing C to be inserted in and removed from said housing.

According to the present invention, the inner raceway member 2 of the ball bearing C is mounted on a sleeve 6 that is supported on the shaft B with its opposite ends disposed in the openings 1 in the end walls of the bearing housing A. The sleeve 6 extends outwardly beyond one end of the raceway member 2 supported thereon where it terminates in an enlarged head portion 7 whose outer peripheral surface 8 tapers inwardly from said end of said sleeve towards said raceway member. The sleeve 6 has a series of circumferentially spaced longitudinal slits 9 therein that extend inwardly from the tapered end 7 thereof to a point located substantially midway of the ends of the raceway member 2 supported thereon.

Mounted on the slit and tapered end 7 of the sleeve 6 in endwise abutting relation to the raceway member 2 thereon is a contractor ring 10 having a tapered bore 11 corresponding to the tapered surface 8 of said sleeve. Near its opposite end, the sleeve 6 is exteriorly threaded, as at 12, to receive a sleeve or ring nut 13 that abuts against the corresponding end of the raceway member 2 and is locked to the sleeve by means of a set screw 14 which is threaded through a radial hole 15 provided therefor in said nut and seats against said sleeve outwardly of the threads 12 thereon.

As shown in the drawing, the openings 1 in the end walls of the housing A are provided with suitable packing rings 16 that bear against the ring nut 13 and contractor ring 10, respectively, and prevent leakage of lubricant from and the entry of dust into said housing through said openings. The ring nut 13 has a radial hole 17 therein adapted to receive a pin (not shown) for loosening or tightening said nut; and the tapered end 7 of the sleeve 6 and the contractor ring 10 cooperating therewith have registering radial holes 18 therethrough adapted to receive a pin (not shown) for holding the sleeve from rotating while the nut is being tightened thereon.

By the arrangement described, the inner raceway member 2 of the bearing C is supported on the mounting sleeve 6 therefor between the contractor ring 10 and the ring nut 13 and said raceway member is firmly clamped endwise between said contractor sleeve and ring nut by tightening the latter on said sleeve. Further tightening of the ring nut 13 draws the sleeve 6 endwise in the direction thereof and the split and tapered head 7 of the sleeve further into the tapered bore 11 of the contractor ring 10, thereby causing the split end of said sleeve to contract radially and grip the shaft B. The nut 13 is then locked to the sleeve 6 by tightening the set screw 14 against said sleeve outwardly of the exteriorly threaded portion 12 thereof. The bearing C is readily removed from the shaft B merely by loosening the nut 13 and tapping the sleeve 6 to release the grip of the contractor ring 10 on the split end thereof, thereby permitting the split end of the sleeve to expand. The sleeve 6, bearing C, contractor ring 10 and ring nut 13 may then be slipped off the shaft B as a complete unit.

It is noted that an important advantage of the hereinbefore described bearing mounting is that it permits the bearing C, together with all of the mounting and securing parts therefor to be applied to and removed from the shaft B as a unit; it also permits the bearing to be quickly and easily secured to the shaft without marring the latter and without any radial distortion of the bearing; and it also prevents leakage of lubricant from the housing A through the sleeve 6.

The hereinbefore described raceway securing means is illustrated in connection with the inner raceway member of a ball bearing. Obviously, however, a similar arrangement may be used for fastening the outer raceway member and the bearing may be of any well known type.

What I claim is:

1. A bearing mounting comprising an inner raceway member, a sleeve projecting through said inner raceway element and beyond opposite ends thereof, one of the projecting end portions of said sleeve being slit longitudinally and having an inwardly tapering conical peripheral surface, a ring mounted on said end portion of said sleeve in endwise abutting relation to said inner raceway element and having a conical bore cooperating with the conical peripheral surface of said sleeve, the other projecting end portion of said sleeve being exteriorly threaded, a nut mounted on said sleeve and cooperating with the exteriorly threaded portion thereof, whereby said inner raceway element is clamped endwise between said ring and nut when the latter is tightened on said sleeve and the slit end portion of said sleeve is adapted to be clamped to a shaft when the conical portion of the sleeve is drawn inwardly in the conical bore of said ring by said nut, and means for locking said nut to said sleeve.

2. A bearing mounting comprising an inner raceway member, a sleeve projecting through said inner raceway element and beyond opposite ends thereof, one of the projecting end portions of said sleeve being slit longitudinally and having an inwardly tapering conical outer peripheral surface, a ring mounted on said end portion of said sleeve in endwise abutting relation to said inner raceway element and having a conical bore cooperating with the conical peripheral surface of said sleeve, the other projecting end portion of said sleeve being exteriorly threaded, a nut mounted on said sleeve and cooperating with the exteriorly threaded portion thereof, whereby said inner raceway element is clamped endwise between said ring and nut when the latter is tightened on said sleeve and the slit end portion of said sleeve is adapted to be clamped to a shaft when the conical portion of said sleeve is drawn inwardly in the conical bore of said ring by said nut, and a set screw threaded through said nut in abutting relation to the unthreaded portion of said sleeve for locking the nut thereto, the cooperating portions of said slit end portion of said sleeve and the ring thereon having registering radial holes therein adapted to receive a pin for preventing rotation of said sleeve when the nut is tightened.

3. A unit-handled bearing mounting comprising an annular raceway element and a sleeve mounted one on the other with the sleeve projecting beyond both ends of the raceway element, one of said projecting end portions of said sleeve being radially flexible, a ring cooperating with said radially flexible end portion of said sleeve and disposed in endwise abutting relation to said raceway element, and a nut threaded on the opposite end portion of said sleeve in endwise abutting relation to said raceway element, said radially flexible end portion of said sleeve and the ring mounted thereon having cooperating longitudinally tapered surfaces, whereby said raceway element is clamped endwise between said rings and the radially flexible end portion of said sleeve is adapted to be forced radially into clamping engagement with a supporting member therefor when said nut is tightened on said sleeve.

4. A unit-handled bearing mounting comprising an annular raceway element and a sleeve mounted one in the other with the sleeve projecting beyond both ends of the raceway element, one of the projecting end portions of said sleeve being slit longitudinally and having a conical peripheral surface, a ring mounted on said end portion of said sleeve in endwise abutting relation to said raceway element and having a conical peripheral surface cooperating with the conical peripheral surface of said sleeve, and a nut threaded on the other end portion of said sleeve in endwise abutting relation to said raceway element, whereby said raceway element is clamped endwise between said ring and nut, and the slit end portion of said sleeve is adapted to be clamped to a supporting member when said nut is tightened on said sleeve against said raceway element.

5. A unit-handled bearing mounting comprising an annular raceway element, a sleeve extending through said raceway element and beyond opposite ends thereof, one of the projecting end portions of said sleeve being slit longitudinally and having an inwardly tapering conical outer peripheral surface, a ring mounted on said end portion of said sleeve in endwise abutting relation to said raceway element and having an inwardly tapering conical bore cooperating with the conical outer peripheral surface of said sleeve, the other projecting end portion of said sleeve being exteriorly threaded, and a nut mounted on said sleeve and cooperating with the exteriorly threaded portion thereof, whereby said raceway element is clamped endwise between said ring and nut when the latter is tightened on said sleeve and the slit end portion of said sleeve is adapted to be clamped to a supporting member when the conical portion of the sleeve is drawn by said nut inwardly in the conical bore of said ring.

WILLIAM I. PIXLEY.